C. B. WATERS.
ELECTRODE HOLDER FOR USE IN ELECTRIC ARC WELDING OR CUTTING.
APPLICATION FILED JULY 18, 1918.
1,332,241. Patented Mar. 2, 1920.
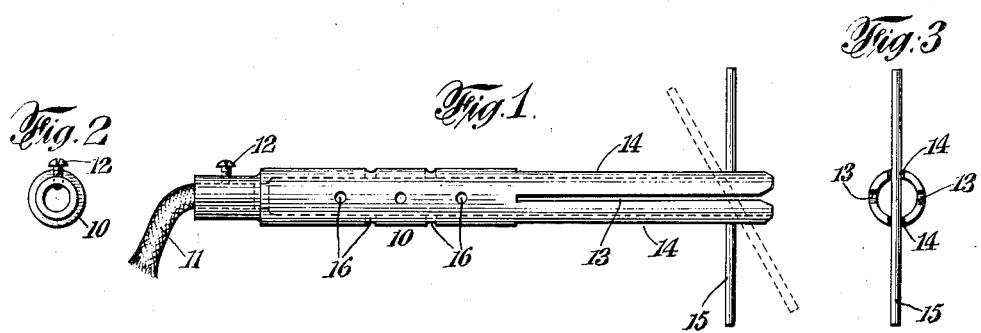
Inventor
Charles B. Waters
By his Attorney

UNITED STATES PATENT OFFICE.

CHARLES B. WATERS, OF NEW YORK, N. Y.

ELECTRODE-HOLDER FOR USE IN ELECTRIC-ARC WELDING OR CUTTING.

1,332,241.   Specification of Letters Patent.   Patented Mar. 2, 1920.

Application filed July 18, 1918. Serial No. 245,459.

*To all whom it may concern:*

Be it known that I, CHARLES B. WATERS, a citizen of the United States, and a resident of New York, in the county of New York and State of New York, have invented certain new and useful Improvements in Electrode-Holders for Use in Electric-Arc Welding or Cutting, of which the following is a specification.

The invention relates to an electrode holder suitable for use in connection with electric arc welding apparatus, wherein an electric arc is maintained between a suitable conducting table or plate or between the work itself and a conducting electrode. In apparatus of this character, the electrode must be retained by some suitable holder which serves, also, to provide the electrical connection thereto.

It is the object of the present invention to provide a holder for this purpose wherein perfect contact is insured, and wherein the said electrode is readily adjustable both in the direction of its length and at an angle to the axis of the holder. A further object of the invention resides in the provision of a holder adapted to receive and securely grip various sizes of electrodes, and also one which will have a longer life than those now generally in use, through a construction of same which permits of refinishing the holder when worn or damaged at the active end.

The nature of the invention will be best understood when described in connection with the accompanying drawings, in which—

Figure 1 is a side elevation of the improved electrode holder with electrode retained thereby.

Fig. 2 is a view looking toward the conductor end with the said conductor removed.

Fig. 3 is a view looking toward the electrode end.

Similar characters of reference designate corresponding parts throughout the several views.

Referring to the drawings, 10 designates a tubular member of conducting metal, possessing sufficient resiliency for the purpose intended, and may consist, for example, of copper tubing. This member is preferably of reduced diameter at the conductor end to receive a conductor or cable 11, which may be soldered therein or secured in any substantial manner, for example by means of a set screw 12. The metal tube may remain exposed, as shown, or may be insulated, if desired, both electrically and thermally; although, with respect to the latter, its surface and construction are preferably designed to be such as to afford ample radiation and ventilation to make such insulation unnecessary.

At its active end, the tube is slitted inwardly in the direction of its longitudinal axis, providing a multiplicity of coöperating slots 13 and 14, which are spaced symmetrically about the tube and extend inwardly a substantial distance, for example, from one-third to one-half of the length of the tube, thus not destroying the rigidity of the tube, yet giving sufficient material for refinishing purposes, as hereinafter set forth. This inward slitting of the tube provides for further cooling through the circulation of air therein, permitted thereby in addition to its main function of holding an electrode 15. Also, ventilating perforations 16 may be made in the tube to enhance the air circulation.

The electrode 15, as shown, is inserted into the holder 10 by forcing same inwardly through a pair of the coöperating slots and is securely gripped by the edges thereof, which not only afford thereby a perfect contact, but permit of the adjustment of said electrode in the direction of its length as it wears. The construction, furthermore, permits of the electrode's assuming an inclined position with reference to the axis of the tube when the character of the work requires such position. It is to be noted in this connection that in providing a plurality of sets of coöperating slots, the use of an electrode in inclined position will not adversely affect the gripping power of the holder at the forward position of contact, in view of the independent action of the top and bottom segments. Moreover, it is to be understood that the electrode 15, in projecting on both sides of the tube, as indicated in Figs. 1 and 3, when worn down sufficiently to require reversal thereof, may be reversed by merely rotating the said tube. In using a carbon electrode, it may be advisable to surround the middle portion thereof by a metal sleeve to insure against cutting of the same, to afford a better contact, and permit of convenient reversal of the electrode.

To facilitate the insertion of an electrode, the entrance portions of the slots 13 and 14 may be suitably notched, as indicated. It is to be understood, also, that the diameter or cross-section of the various slots is suited to the character of electrode to be retained thereby and will grip same, due to the resiliency of the metal tube, sufficiently for all purposes. Various sizes of slots may be provided to accommodate different sizes of electrodes, as indicated more clearly in Fig. 3 of the drawings, wherein the slots 14 are shown larger than the slots 13, and their number is not limited to that disclosed herein. Moreover, in the event of the electrode end of the tube 10 becoming burned or otherwise injured or destroyed, the holder may be readily refinished by merely cutting off the damaged portion as by sawing, or in any other convenient manner, and then cutting in the tapered notches for the slots. In this manner, the holder may be made to serve a much longer time than the usual type heretofore employed for the same purpose.

I claim:

1. An electrode holder for arc welding and cutting apparatus, comprising: an electrically conductive tubular member adapted to receive in one end a conducting cable and being provided with oppositely-disposed, coöperating slits in the other end to grip and retain a suitable electrode transversely to the axis of said tubular member.

2. An electrode holder for arc welding and cutting apparatus, comprising: an electrically conductive tubular member of resilient material and adapted to receive in one end a conducting cable and being provided with oppositely-disposed, coöperating slits in the other end to grip and retain a suitable electrode transversely to the axis of said tubular member.

3. An electrode holder for arc welding and cutting apparatus, comprising: an electrically conductive tubular member adapted to receive in one end a conducting cable, and at the other end slitted inwardly to provide a plurality of sets of oppositely-disposed slots within which an electrode may be held transversely to the axis of said tubular member.

4. An electrode holder for arc welding and cutting apparatus, comprising: an electrically conductive tubular member adapted to receive in one end a conducting cable, and at the other end slitted inwardly to provide a plurality of sets of different sized oppositely-disposed slots within which an electrode may be held transversely to the axis of said tubular member.

Signed at New York, in the county of New York and State of New York this 16th day of July, A. D. 1918.

CHARLES B. WATERS.